Dec. 22, 1942. E. DUKE 2,306,245
DOUGH DEPRESSING MEANS FOR MIXING MACHINES
Filed April 17, 1942
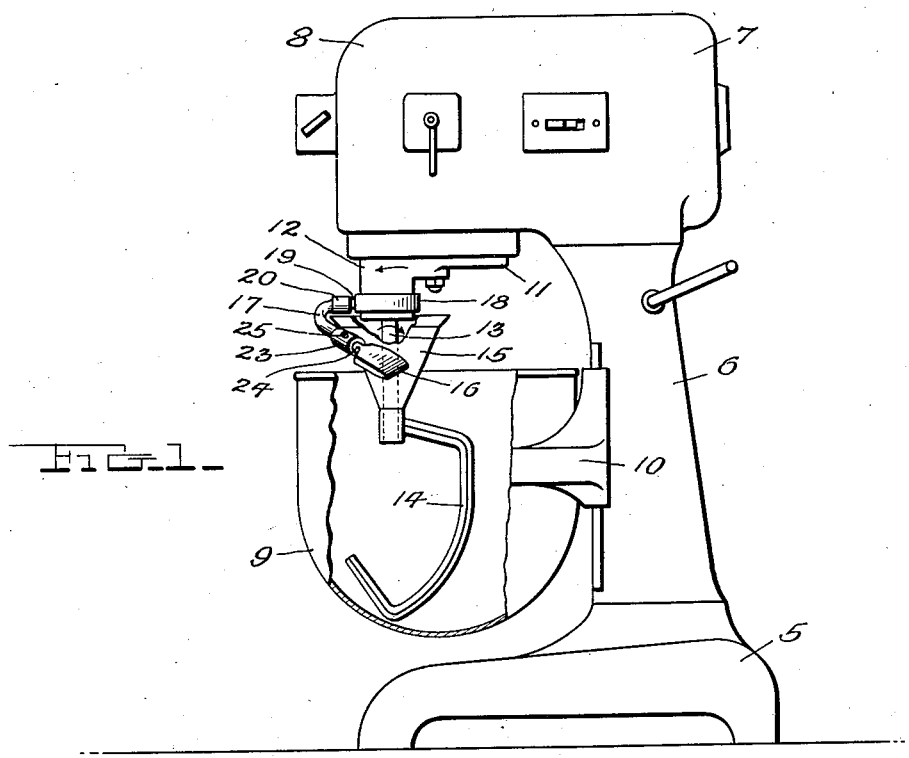
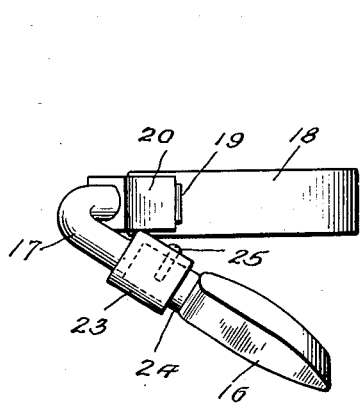
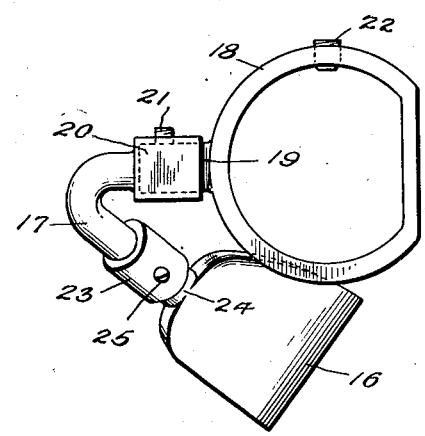
Inventor
Edgar Duke
By H. B. Wilson & Co.
Attorneys Patented Dec. 22, 1942

2,306,245

UNITED STATES PATENT OFFICE 2,306,245

DOUGH DEPRESSING MEANS FOR MIXING MACHINES

Edgar Duke, Idaho Falls, Idaho

Application April 17, 1942, Serial No. 439,407

3 Claims. (Cl. 259—102)

A well known type of mixing machine comprises a mixing bowl, a gear box overhanging said bowl, a rotatable head at the under side of said gear box, and rotatable upon a vertical axis, a vertical rotary shaft mounted on said rotatable head in spaced relation with the axis of said head, and a mixing arm or stirrer secured to said shaft and disposed in said bowl. While such a mixing machine may be advantageously used for mixing more or less fluid contents in the bowl, difficulty is encountered when mixing bread or other thick dough, as such dough when reaching a certain degree of stiffness, rotates in a body with the mixing arm or stirrer, and some of it ascends, creeps over the rim of the usual funnel-like upper end of the mixing arm or stirrer, and crowds into same around the shaft. Not only is it troublesome to later dig out this dough, but it has, in the meantime, become blackened from the inevitable oozing of shaft lubricant and is, therefore, unfit for use. My invention aims to overcome this difficulty in a simple and effective manner.

With the foregoing in view, the invention resides in the novel subject matter hereinafter described and claimed, description being accomplished by reference to the accompanying drawing.

Figure 1 is a side elevation partly broken away and in section, showing one of the many ways which may be employed for mounting the dough-depressing paddle of the invention in proper relation with other parts.

Figure 2 is a side elevation of the paddle and its mounting means looking in a different direction from Fig. 1.

Figure 3 is a top plan view of the paddle and its mounting means.

In the drawing above briefly described, a mixing machine is shown comprising a base 5, a standard 6 rising from said base, an electric motor 7 and gear housing 8 mounted on said standard, a mixing bowl 9 supported by vertically adjustable arms 10 engaging the standard, a head 11 mounted at the underside of the gear box 8 and rotatable about a vertical axis, said head having a downwardly projecting bearing boss 12 spaced radially from its axis of rotation, a vertical rotary shaft 13 passing through and projecting downwardly from said bearing boss, and a mixing arm or stirrer 14 within the bowl 9 and secured to the shaft 13, said mixing arm or stirrer being provided with the usual inserted cone 15 at its upper end. Due to the driving mechanism connecting the head 11 and shaft 13, with the motor 7, the head is driven counter-clockwise and the shaft clockwise, as indicated by the arrows in Fig. 1, so that while the mixing arm or stirrer 14 is being rotated, it is also carried along a circular path, all of which is conventional. With this conventional structure, the difficulty above set forth occurs when mixing stiff dough, such as bread dough. Some of this dough ascends as it rotates bodily with the mixing arm or stirrer 14. The ascending dough creeps inwardly over the rim of the funnel-like portion 15, and this inwardly creeping dough enters the aforesaid conical portion 15 and crowds around the shaft 13. Not only is it later difficult to remove this dough, but in the meantime, it has become blackened from oozing shaft lubricant and is unfit for use.

To arrest and depress the dough ascending around the inverted cone 15, I provide a paddle 16 which is provided with a substantially flat lower side cooperable with the periphery of said inverted cone 15 in forming a downwardly open corner to receive the ascending dough, said lower side of said paddle being inclined in a direction to push this dough down, thus overcoming the difficulty in question. This paddle is mounted upon the head 11 so that while the body of dough rotating with the stirrer or the like 14 is being pushed against said paddle, the paddle itself is being also pushed against the dough by the rotation of the head 11.

In the present disclosure, the paddle 16 is rigidly carried by an arm 17, which arm is rigidly carried by a collar 18 secured around the bearing boss 12. The arm 17 extends outwardly from the collar 18 and then extends downwardly in an inclined direction, and said arm mounts the paddle 16 in an inclined position at the periphery of the conical portion 15 of the stirrer or mixing arm 14. The paddle will thus depress any ascending dough and will consequently overcome the difficulty above pointed out.

In the preferred form of construction, the collar 18 is provided with an integral outwardly projecting stud 19 of flat-sided form, said stud being received in a socket 20 on the upper end of the arm 17. A suitable screw 21 is shown for locking the socket 20 upon the stud 19, and another set screw 22 has been disclosed for securing the collar 18 to the bearing boss 12. I have shown another socket 23 on the lower end of the arm 17. This socket receives a shank 24 on the upper end of the paddle 16 which shank is locked in said socket by a suitable screw or the like 25.

By loosening the set screw 21, the arm 17 and paddle 16 may be removed, for cleaning or when their use is not required.

From the foregoing, taken in connection with the accompanying drawing, it will be seen that novel and advantageous provision has been made for carrying out the object of the invention. While preferred details have been disclosed, for use when adapting the invention to machines already constructed, it is to be understood that I am not restricted to the exact disclosure herein made, numerous variations being possible, within the scope of the invention as claimed.

I claim:

1. A depressing device for dough ascending in a mixing machine during performance of a mixing operation, said device comprising a horizontal collar to surround a conventional boss of the machine, means for securing said collar in place, an arm secured to said collar and extending outwardly therefrom and then downwardly in an inclined direction, and an inclined dough-depressing paddle secured at its upper end to the lower end of said arm.

2. A depressing device for dough ascending in a mixing machine during performance of a mixing operation, said device comprising a horizontal collar to surround a conventional boss of the machine, said collar having a set screw for securing it in place, said collar being provided with a radially projecting flat-sided stud, an arm having a flat-sided socket at one end snugly receiving said flat-sided stud, said socket being provided with a set screw for removably securing it upon said stud, said arm extending substantially horizontally outward from said collar and having its outer end portion bent at an acute angle to its inner end portion and declined from said inner end portion, the lower end of said outer end portion of said arm being provided with a socket, an inclined dough-depressing paddle having an integral shank snugly received in the last mentioned socket, and a screw securing this socket and shank together.

3. An improvement in a mixing machine of the type having a mixing bowl, a gear box overhanging said bowl, a rotatable head mounted at the underside of said gear box and rotatable in one direction upon a vertical axis, a vertical shaft carried by said head in radially spaced relation with the axis thereof and rotatable reversely from said head, and a stirrer secured to said shaft and disposed in said bowl, said stirrer having an inverted cone at its upper end; said improvement comprising an inclined paddle disposed at the periphery of said inverted cone, said paddle having a substantially flat lower side cooperable with the periphery of said inverted cone in providing a downwardly open corner to receive dough ascending around said inverted cone, said paddle being inclined in a direction to depress the dough received in said corner and an arm rigidly mounting said paddle, said arm being secured to the upper end of said paddle and to said rotatable head.

EDGAR DUKE.